Inventor,
Frank W. Hewitt
by Heard Smith & Tennant.
Attys.

Feb. 4, 1930.   F. W. HEWITT   1,745,420
SELF CONTAINED ELECTRICAL REGULATOR UNIT
Filed Sept. 2, 1926   5 Sheets-Sheet 2
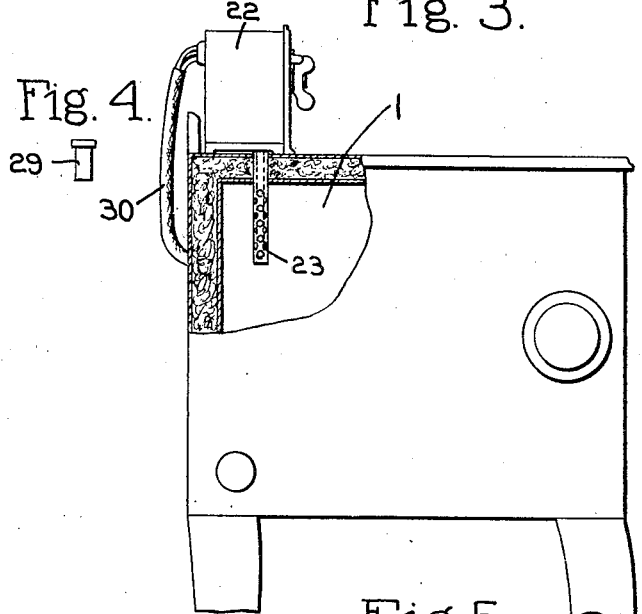
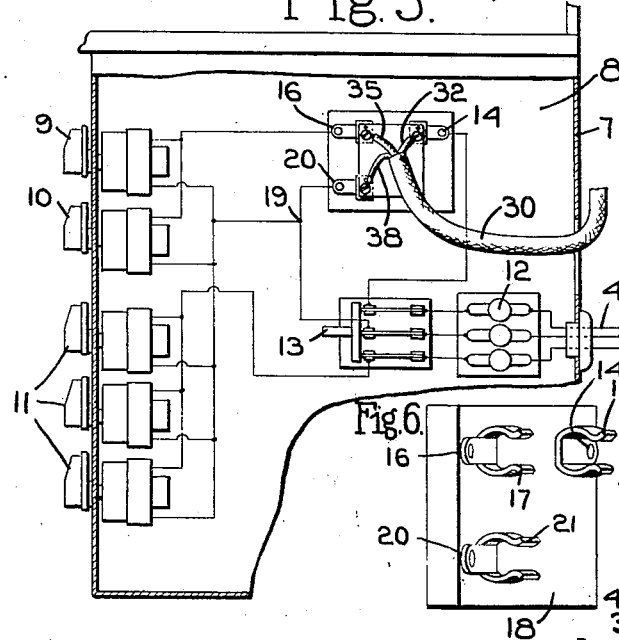
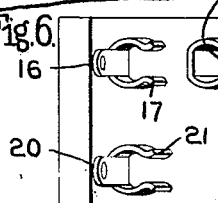
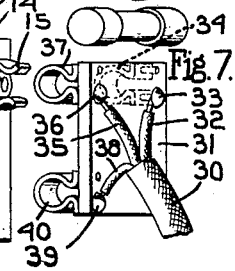
Inventor.
Frank W. Hewitt
by Heard Smith & Tennant
Attys Feb. 4, 1930. F. W. HEWITT 1,745,420
SELF CONTAINED ELECTRICAL REGULATOR UNIT
Filed Sept. 2, 1926 5 Sheets-Sheet 3
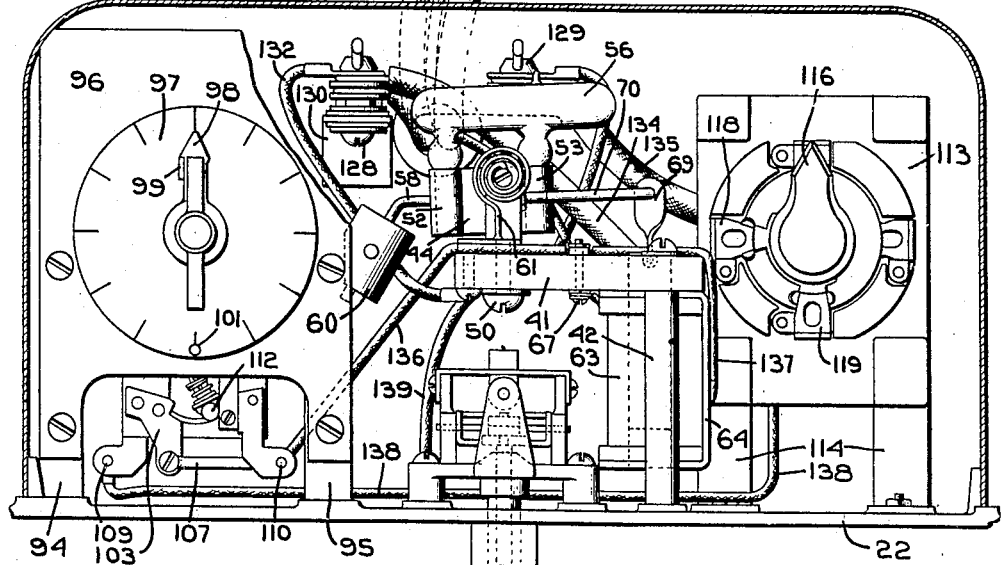
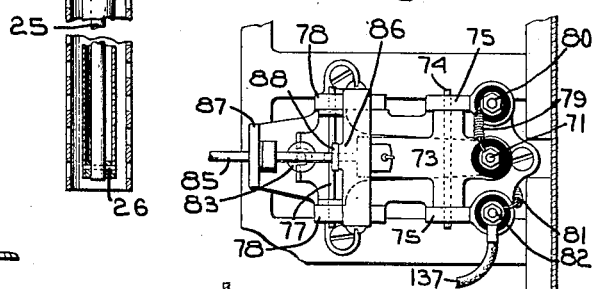
Inventor
Frank W. Hewitt
by Heard Smith & Tennant.
Attys.

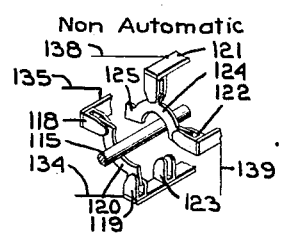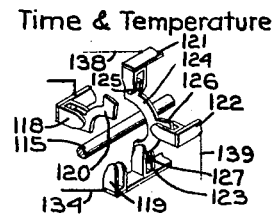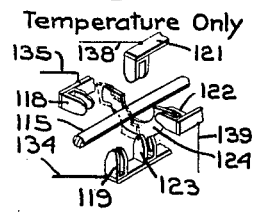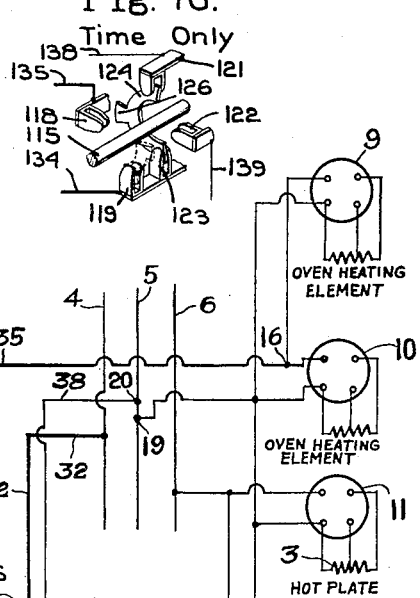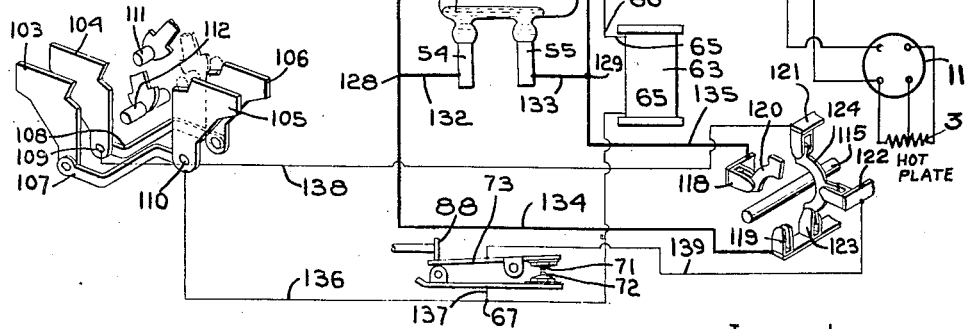

Feb. 4, 1930.   F. W. HEWITT   1,745,420
SELF CONTAINED ELECTRICAL REGULATOR UNIT
Filed Sept. 2, 1926   5 Sheets-Sheet 5
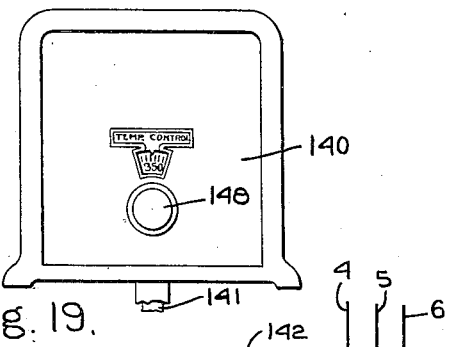
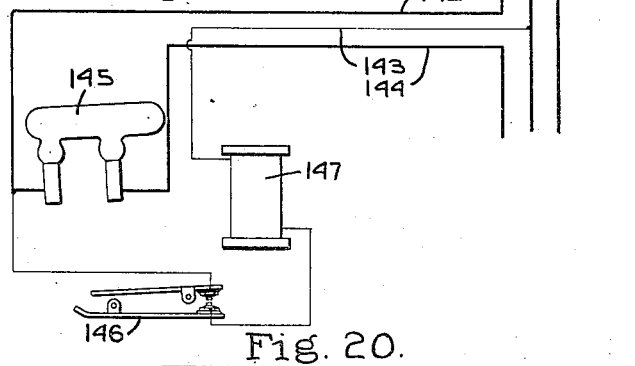
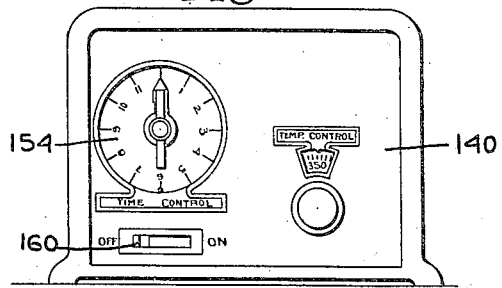
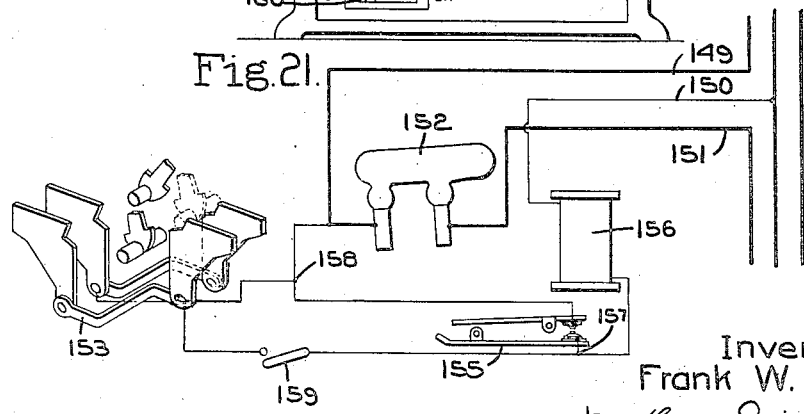
Inventor
Frank W. Hewitt
by Heard Smith & Tennant
Attys.

Patented Feb. 4, 1930

1,745,420

UNITED STATES PATENT OFFICE

FRANK W. HEWITT, OF ARLINGTON, MASSACHUSETTS, ASSIGNOR, BY MESNE ASSIGNMENTS, TO BUCKWALTER STOVE COMPANY, OF ROYERSFORD, PENNSYLVANIA, A CORPORATION OF PENNSYLVANIA

SELF-CONTAINED ELECTRICAL REGULATOR UNIT

Application filed September 2, 1926. Serial No. 133,279.

This invention relates to means for controlling the supply of current to an electrically heated device and in particular an electrically heated cooking range, and still more particularly the oven of such range.

The object of the invention is to provide a self-contained unit comprising a casing having there within the entire mechanism necessary for any or all of the various thermostatic or time controls required or necessary and with means for manually positioning or adjusting the control at the exterior of the casing.

The object of the invention is further to provide such a self-contained regulator unit so constructed that it may be readily placed in position and removed from the range or other device, thus enabling the range or other device to be sold and used without the controlling mechanism and to be supplied at any time with such controlling mechanism.

The object of the invention is further to provide a combination of an electrically heated range having an oven and a self-contained regulator unit for controlling the temperature of the oven, both so constructed that the regulator unit may be readily and easily connected to or disconnected from the range.

The object of the invention is further to provide a range construction adapted to coöperate with such a self-contained regulator unit.

The object of the invention is further to provide such a self-contained regulator unit in which the controlling mechanism contained therein may be of various types, as required.

These and other objects and features of the invention will appear more fully from the accompanying description and drawings and the scope of the invention will be defined in the claims.

The drawings illustrate preferred forms of apparatus embodying the invention as adapted particularly for the control of the heating of the oven portion of an electric range, but it will be understood that this is but a preferred instance of the useful adaptation of the invention.

As the construction of an electric range and its heating elements are well known and familiar to those skilled in the art and as the present invention is not concerned with the particular form of such a device, it is only necessary to illustrate and describe such a range sufficiently to indicate the application of the invention thereto.

In the drawings:

Fig. 3 is a left-hand end elevation of the upper portion of the range partially broken away to show the installation of the regulator unit.

Fig. 4 is an elevation of a plug to be inserted in the top of the oven when the regulator unit is removed.

Fig. 5 is a right-hand elevation partially broken away and partially in vertical cross section showing the wiring connections and the means for inserting the regulator unit into the supply circuit.

Fig. 6 is a perspective view of a receptacle in the supply circuit.

Fig. 7 is a perspective view of a plug connected with the regulator unit and insertable in the receptacle shown in Fig. 6.

Fig. 8 is a perspective view of a connecting plug insertable in the receptacle to maintain the supply circuit when the plug shown in Fig. 7 is removed.

Fig. 9 is a view in front elevation of a regulator unit with the front of the casing removed and with portions broken away.

Fig. 10 is a detail in top elevation of a portion of the mechanism of the regulator unit particularly illustrating the main switch.

Fig. 11 is a detail in top plan view of a portion of the mechanism of the regulator unit particularly illustrating the thermostat-controlled switch.

Fig. 12 is a view in side elevation and partially in vertical cross section showing the thermostatic-controlled switch and connecting parts.

Figs. 13, 14, 15 and 16 are somewhat diagrammatic views in perspective illustrating the positions of the regulator switching mechanism for non-automatic control, joint time and thermostat control, thermostat control only, and time control only, respectively.

Fig. 17 is a diagrammatic view of the main elements and circuit connections of the regulator unit of the preceding figures.

Fig. 18 is a front elevation of a regulator unit arranged for thermostatic control only.

Fig. 19 is a diagrammatic view of the main elements and circuit connections of the regulator unit shown in Fig. 18.

Fig. 20 is a front elevation of the regulator unit arranged for either thermostatic control only or joint thermostatic and time control.

Fig. 21 is a diagrammatic view showing the main elements and circuit connections of the regulator unit illustrated in Fig. 20.

Figure 1:
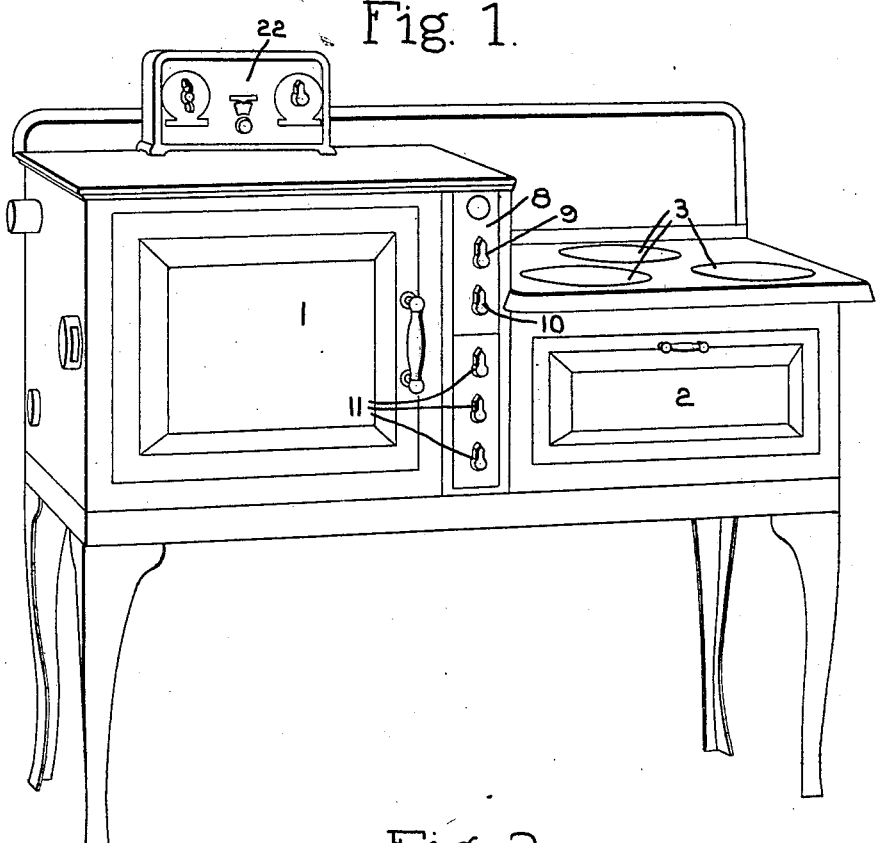
Fig. 1 is a view in front perspective of an electric range such as shown, for example in my prior Patent No. 1,307,048, granted June 17, 1919.

The electric range, which is illustrated as a suitable instance of a device electrically heated by a supply circuit, is shown as comprising a baking oven 1, a broiling oven 2 and three hot plates 3, each provided with suitable resistance heating elements, not shown, to which current is supplied from the usual supply circuits. The main circuit wires 4, 5 and 6 are shown as entering through the back 7 of the range into the connection box 8, on the front wall of which are mounted the switch handles 9, 10 and 11 for turning on and off the current to the baking oven, the broiler oven and the hot plates, respectively. These wires are shown as passing through the usual fuses 12 and knife switch 13. The supply circuit, which is shown, for purposes of disclosing the present invention, as controlled by the regulator unit of this invention, is the circuit formed by the service wires 4 and 5 and which heats either or both of the ovens 1 and 2, according as the switches 9 and 10 are opened or closed. The wire 4 is shown as opened and connected at 14 to a binding post 15 and at 16 to a binding post 17 mounted on a receptacle block 18. The wire 5 is tapped at 19 and connected at 20 to a binding post 21 on this receptacle block 18, which is secured in place in the connection box 8.

The regulator unit is a self-contained device. It comprises a suitable casing within which, in the preferred form illustrated, is contained all of the various elements necessary for the control of the supply of current to the device to be heated, in this case the oven. In the preferred form illustrated, the casing 22 is a generally rectangular box-like structure and adapted to stand on the top of the baking oven. Depending from the base of this casing 22 is preferably an open or reticulated metal tube 23 which acts to protect the thermostat. The thermostat is shown as comprising two elements having different coefficients of expansion such as the tube 24 and the rod 25 rigidly secured together at the bottom, as by the pin 26. In the construction illustrated the tube 24 at its upper end is rigidly secured to the casing by being threaded into a socket in a supporting bracket 27, in turn rigidly secured by the screws 28 to the casing. Consequently, due to the relative expansion between the tube 24 and the rod 25, the upper end of the rod 25 moves up and down with temperature changes. This thermostat controlling element comprising, preferably, the protecting tube 23 and the heat responsive elements 24 and 25 is locatable in the electrically heated oven by being freely inserted in the oven 1 through a hole formed in the top of the oven for that purpose and may freely be withdrawn from this hole when the regulator unit is to be removed. When the regulator unit with the thermostat is removed or not in use, a suitable plug 29, shown separately in Fig. 4, is inserted in the hole in the oven.

The connections from the regulator unit to the supply circuit are made by a cable 30 extending out through the back of the casing 22. This cable contains three wires which are shown in Fig. 7 connected to a plug 31, the wire 32 being connected at 33 to the lug 34 cooperating with the binding post 15, the wire 35 being connected at 36 to the lug 37 cooperating with the binding post 17 and the wire 38 being connected at 39 to the lug 40 cooperating with the binding post 21.

All of the mechanism by means of which the supply of current to the oven is controlled is contained within the casing so that the casing with its contents constitutes a self-contained regulator unit. This unit is readily put in place simply by positioning it on the top of the oven with the thermostatic element located in the hole in the oven top and with the plug 31 inserted in the binding posts in the receptacle 18. The range may therefore be furnished or sold without the regulator unit, but preferably provided with the receptacle 18 and the connector plug shown in Fig. 8 in place. While this is convenient, it is not necessary because the regulator unit may be installed in any range simply by boring a hole in the top of the oven and cutting the supply wire 4 and connecting the wires 32, 35 and 38 to the supply circuit.

If it is desired to remove the regulator unit for repair or replacement, it is an extremely simple matter to do so and the range is left ready for use in the ordinary way. All that is necessary to do is to remove the unit and, if the receptacle 18 is provided, insert the connector plug shown in Fig. 8, or if such receptacle is not provided, connect together the separated ends of the circuit wire 4.

The commercial advantages of a self-contained regulator unit of this character are obvious. The manufacturer or dealer is only required to carry in stock a complete line of ranges or other electrically heated devices and a number of regulator units. The ranges or other devices may be sold with or without the units, as desired, and if sold without the units, the regulator units may thereafter be furnished. In case a regulator unit needs repair when in use, it can be removed and a new one immediately substituted without in any way inconveniencing the user or delaying the use of the range or other device.

In the preferred form of the invention, the regulator unit is of the type permitting what is herein referred to as full automatic control, that is, it is provided with mechanism by which the user may position the controlling mechanism so that the supply of current to the heater from the supply circuit may be either (a) under thermostatic control alone, (b) under the control of a chronometer or timing mechanism alone, (c) under the control of the thermostat for a predetermined period of time determined by the chronometer or timing mechanism, or (d) under non-automatic control.

A simple and preferred form of construction for providing in the regulator unit this type of full automatic control is shown in the first seventeen figures of the drawing.

At the center of the casing an insulating platform 41 is supported by vertical posts 42 from the bottom of the casing 22. This platform carries the main switch and the electromagnet.

The main switch is self-closing being, in the construction shown, closed by gravity. This switch is thrown to open position and maintained in open position by and during the energization of the magnet. A mercury switch of generally standard form is preferably employed. As illustrated, a block of insulation material 43 is provided at its ends with the angular metal plates 44 and 45 secured thereto and terminating in aligned journals 46 and 47. These journals are pivotally mounted respectively in metal bearing blocks 48 and 49 which are supported on the platform 41 and extend down therethrough and terminate in binding posts 50 and 51, respectively. The angle plates 44 and 45 are bent to form sockets 52 and 53, respectively, in which are mounted the legs 54 and 55 of the glass tube 56 containing mercury 57. An arm 58 is secured in the pivoted block 43 and has adjustably secured thereon by means of the set screw 59 a weight 60. It will thus be seen that the switch is normally rocked by the weight counterclockwise, whereupon the body of mercury 57 runs to the left in the tube 56 and establishes connection between the legs 54 and 55 and thence through the parts already described establishes connection between the binding posts 50 and 51.

To insure a good electrical connection, a flexible braided wire 61 is soldered to each bearing block 48 and 49 and wound about and secured to each journal 46 and 47, the end of the wire in each case being passed through the journal and secured by a set screw 62.

The electromagnet 63 is shown as supported on a bracket 64 secured to the bottom of the platform 41. The armature winding 65 of the magnet is secured at one end to the binding post 66 and at the other end to the binding post 67 on the platform. The core 68 of the magnet is provided with an ear 69 extending up through an aperture in the platform 41 and this ear is pivotally connected to the bent end of an arm 70 projecting from and rigidly secured in the pivoted block 43 of the main switch. Consequently when the magnet is energized, the core will be drawn down and the main switch rocked to its open position or a position where the mercury will run into the right-hand end of the tube and break connection between the legs 54 and 55.

The thermostat control switch is mounted on the supporting bracket 27 directly beneath the main switch. The contact points 71 and 72 are shown as carried respectively by a lever 73 pivoted near its rear end at 74 in arms 75 extending upwardly from the supporting bracket 27 and by a lever 76 pivoted near its forward end at 77 in arms 78 extending upwardly from the supporting bracket. The contact point 71 of the upper lever is insulated from the lever and is connected by the wire 79 to the binding post 80 on, and insulated from, the bracket 27. The contact point 72 of the lower lever is insulated from the lower lever and connected by the wire 81 to the binding post 82 secured in, and insulated from, the bracket 27. The front end of the lever 76 rests against a pair of lock nuts 83 threaded on the upper end of the rod 25 of the thermostat and a small compression spring 84 acts to hold the end of the lever in engagement with these nuts. A shaft 85 journalled at its rear end in a bar 86 connecting the arms 78 and at its forward end in an arm 87 extended upwardly from the supporting bracket 27 carries a cam 88 resting on the front end of the lever 73 and the lever is held against this cam by a light tension spring 89. The shaft 85 extends out through the front of the casing and is provided with a knob 90. On the shaft immediately behind the front of the casing is mounted a graduated disk sector 91 graduated to indicate temperature and exposed through an opening 92 in the casing having at its upper edge a pointer 93. The lock nuts 83 provide means for adjusting the thermostat and the graduations on the disk 91 are correlated to the shape of the cam 88 so that the switch points 71 and 72 will open and close when the temperature falls below or rises above that indicated by the pointer 93. The thermostatic switch thus provided is very accurate because it will be noted that the movement of the thermostatic element is magnified by the lever 76, while the adjusting movement given by the cam 88 is reduced by the lever 73.

The chronometer-controlled switch and the chronometer mechanism for controlling it are shown as located at the left-hand end of the casing. As this mechanism is of standard form, it needs no detailed description. It is shown as supported on brackets 94 and 95 extending upwardly from the bottom of the casing. This mechanism has a front plate 96 in which is concentrically pivoted, first, a disk 97 preferably graduated like a clock face to hours and fractions thereof, second, a pointer 98 provided with a forwardly projecting lug 99 and, third, a pointer 100. The disk and pointers are exposed through an opening in the front of the casing. The disk is also provided with a handle 101 by means of which it may be manually rotated. The pointer 98 may be manually rotated by means of the lug 99 and the pointer 100 is provided with thumb pieces 102 by which it may be manually rotated.

This mechanism in its standard form is provided with two pairs of contact arms 103, 104, 105 and 106. The contact arms 103 and 104 are located in planes in front of the contact arms 105 and 106. The contacts 103 and 105 are connected at 107, and 104 and 106 are connected at 108 and binding posts are provided at 109 and 110. A switch bar 111 is controlled by the chronometer mechanism and the pointer 100 to make and break contact with the contact arms 105 and 106, while a second switch bar 112 is controlled by the chronometer mechanism and the pointer 98 to make and break contact with the contact arms 103 and 104.

In this mechanism in its standard form clockwise rotation of the pointer 100 winds up a spring mechanism, which thereupon acts to turn the pointer 100 clockwise at a uniform time rate. When the pointer 98 is in its vertical position, the contact bar 112 is out of engagement with the contact arms 103 and 104 and when the pointer is turned clockwise, the contact bar 112 moves immediately to make contact. When the pointer 100 is in its vertical position, the contact bar 111 is in engagement with the contact arms 105 and 106, but when this pointer is moved clockwise, the contact bar 111 is immediately swung out of engagement with the contact arms 105 and 106. Consequently it will be seen that the circuit leading to the binding posts 109 and 110 is closed whenever the pointer 98 has been turned clockwise, because, when turned clockwise, it takes with it the pointer 100. The circuit will therefore remain closed until the pointer 98 returns to the vertical position and will then open and remain open until the pointer 100 has returned to vertical position if the pointer 100 was advanced farther to the right than the pointer 98. When the pointer 100 is alone turned to the right, the circuit will be opened and remain open until it returns to its vertical position.

The regulator switching mechanism is illustrated as of a standard type and is mounted in the right-hand end of the casing. It comprises an insulating base 113 mounted on posts 114 secured to the base of the casing. This mechanism comprises a shaft 115 having a pointer 116 on the outer face of the casing. A dial 117 on the outer face of the casing bears the necessary insignia to indicate the position of the pointer and consequently of the regulator switching mechanism. There are provided a number of fixed contacts on the base 113 and a number of movable contacts, both of which are separately illustrated in Figs. 13 to 16, which figures show the different positions of the switching mechanism. The contacts 118 and 119 are arranged near the front and a contact bar 120 carried by the shaft 115 cooperates with these contacts. It will be seen, therefore, that there is but one position, namely that shown in Fig. 13, where the contact bar 120 functions. The contacts 121, 122 and 123 are mounted in the base 113 in a plane to the rear of the contacts 118 and 119. A contact bar 124 is provided with three contact fingers 125, 126 and 127 so arranged that in one position of the switch, as shown in Fig. 14, it will connect the contacts 121, 122 and 123, in another position, as shown in Fig. 15, it will connect the contacts 122 and 123, and in the third position, shown in Fig. 16, it will connect the contacts 121 and 123. The contacts 119 and 123 are formed on the same metal base and are thus electrically connected. The control effected by the different positions of the regulator switch is indicated by the insignia on the dial in Fig. 2 and the titles appearing in connection with Figs. 13 and 16.

Two binding posts 128 and 129 are insulated from and mounted in brackets 130 and 131 secured to the back of the casing.

The circuit wire 35 is connected to the binding post 128 and the circuit wire 32 to the binding post 129. A wire 132 connects the binding posts 128 and 50 and a wire 133 connects the binding posts 129 and 51, thus inserting the main switch in the supply circuit line 4. A wire 134 connects the binding post 128 and the contact 119 and a wire 135 connects the binding post 129 and the contact 118, thus inserting a shunt circuit, containing the contacts 118 and 119 of the regulator switch, around the main switch. The wire 38 which is connected to the supply line 5 is connected to the binding post 66 to which the magnet winding 65 is connected. From the other binding post 67 to which the magnet winding 65 is connected extend two wires 136 and 137. The wire 136 is connected to the binding post 110 and consequently to the contacts 103 and 105 of the chronometer-controlled switch. The other contacts 104 and 106 are connected, by a wire 138 extending from the binding post 109, to the contact 121 of the regulator switch.

The wire 137 which branches from the contact post 67 is connected to the binding post 82 and consequently to the contact point 72 of the thermostat-controlled switch. A wire 139 is connected to the binding post 80 and consequently to the other contact point 71 and to the contact 122 of the regulator switch.

Thus it will be seen that a second shunt circuit is formed containing the winding of the magnet 63 and dividing between the binding post 67 and the contact 123 into two branches in parallel, one branch containing the chronometer-controlled switch and the contacts 121 and 123 of the regulator switch and the other branch containing the thermostat-controlled switch and the contacts 122 and 123 of the regulator switch. It will be observed also that this second shunt circuit with its two branches in parallel as a whole is inserted in the supply circuit around the heating elements of the oven and the first shunt circuit.

The operation of the preferred form of mechanism thus illustrated and described will now be apparent. Four different conditions of operation are provided for. In each it will be assumed that the switch such as 9 has been closed, the regulator unit has been placed in position and properly connected to the supply circuit.

*A. Thermostatic control alone.*—If the operator desires the supply of current to the device to be heated, such as the oven, to be controlled solely by the thermostat and thus to be maintained at a given temperature, he turns the knob 90 to cause the desired temperature on the sector disk 91 to appear opposite the pointer 93. He then turns the pointer 116 of the regulator switch to point to the indication "Temperature only". This brings the contacts of the regulator switch into the position shown in Fig. 15, establishing the shunt circuit through the magnet winding and the branch through the thermostatically-controlled switch, opening the branch containing the chronometer-controlled switch and opening the first shunt circuit around the main switch. The oven being cold, the thermostatic-controlled switch is open and consequently the main switch closes by gravity and the oven heats up until the designated temperature is reached, when the thermostat switch closes, the magnet is energized and the main switch opened, cutting off the current. When the temperature falls below that designated, the thermostat-controlled switch opens and thus the operation is repeated and thus the temperature is maintained under the control of the thermostat at the designated degree.

Figure 2:
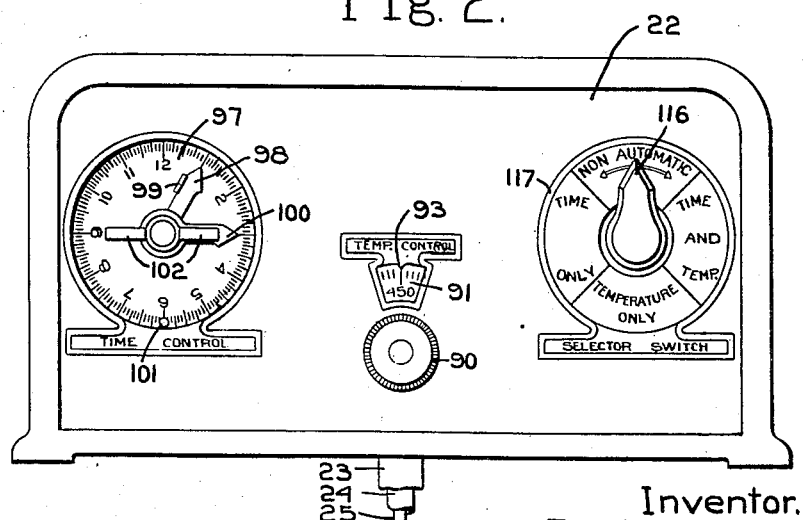
Fig. 2 is a front elevation of a preferred form of the regulator unit as arranged for full automatic control.

*B. Time control alone.*—If the operator desires the oven to be maintained at the heat resulting from the supply of current through the supply circuit for a given period of time, he makes use of the time control. To do this the pointer 116 of the regulator switch is turned to the designation "Time only". This brings the contacts of the regulator switch into the position shown in Fig. 16, establishing the shunt circuit through the magnet winding and the branch through the chronometer-controlled switch, opening the branch containing the thermostat-controlled switch and opening the first shunt circuit around the main switch. Preferably now the dial 97 is turned to bring the present hour of the day in line with the pointers in vertical position. If the oven is to be heated for a given period beginning immediately and extending, say, for two hours, the pointer 100 is turned to point to the graduation two hours hence. The pointer 98 being in the vertical position, the contacts 103 and 104 are open and when the pointer 100 is thus turned, the contacts 105 and 106 are opened. Consequently the magnet circuit is opened and the main switch closes. Thus the main circuit is closed and remains closed until the time to which the pointer 100 has been turned has elapsed, when, by the operation of the time mechanism, the pointer 100 will return to vertical position, closing the contacts 105 and 106 and thus closing the magnet circuit, energizing the magnet and opening the main switch. If it is desired to heat the oven for a future predetermined period, both pointers 98 and 100 are turned, the pointer 98 to indicate the beginning of the period and the pointer 100 to indicate the end of the period. For example, as illustrated in Fig. 2, if the present hour is twelve o'clock, the disk 97 is set with the figure 12 at the top, and if it is desired that the oven should be heated during a period beginning at one o'clock and expiring at three o'clock, the pointer 98 is turned to point to one o'clock and the pointer 100 to point to three o'clock. The turning of the pointer 98 closes the contacts 103 and 104 energizing the magnet and opening the main switch. As the pointers rotate under the control of the time mechanism in the reverse direction and the pointer 98 reaches the vertical position, the contacts 103 and 104 are opened, the magnet circuit is deenergized, and the main switch closes. This condition now continues until the pointer 100 reaches vertical position, when the contacts 105 and 106 close, again energizing the magnet and opening the main switch.

*C. Thermostatic control for a predetermined period of time.*—If the operator desires the oven to be maintained at a given temperature throughout a given period of time, he turns the pointer 116 of the regulator switch to the indication "Time and temperature", turns the knob 90 to indicate the required temperature, as already described, and sets the dial 97 and the pointers 98 and 100 in the manner already described. The positioning of the regulator pointer brings the contacts of the regulator switch into the position shown in Fig. 14 establishing the shunt circuit through the magnet winding and through both branches, the one through the chronometer-controlled switch and the other through the thermostat-controlled switch, and opening the first shunt circuit. Consequently the main switch can only be closed during the period designated by the time control and during that period will be opened and closed by the thermostatic control to maintain the required temperature.

D. *Non-Automatic control.*—If the operator desires the heating to be effected without either time or temperature control, or as if the regulator unit were not in use, then the pointer 116 is turned to the designation "Non-automatic". This places the regulator contacts in the position shown in Fig. 13, closing the first shunt circuit through the contacts 118 and 119 and maintaining open the shunt circuit with its branches through the magnet winding.

Many of the advantages of the invention in its broader aspects may be secured by a range of control of more limited extent than the full automatic control already described. Self-contained regulator units illustrating the more limited range of control are shown in Figs. 18 to 21 of the drawings.

In Figs. 18 and 19 is illustrated a self-contained regulator unit and the wiring diagram therefor when the control is simply thermostatic. In this case the casing 140 is similar to that already described, but is much smaller. The thermostat element 141 projects from the bottom of the casing and is insertable in the oven or other device in the same manner as heretofore. Wires 142, 143 and 144 corresponding respectively to the wires 35, 38 and 32 are inserted in the supply circuit lines 4 and 5, as heretofore. Inside the casing there is installed simply a main switch 145 which may be of the same character as that already described, a thermostatically-controlled switch 146 and an electromagnet 147, both of which may be of the same character as that already described. It will thus be seen that there is but a single shunt circuit around the main switch and that this shunt circuit contains the winding of the magnet 147 and the contact points of the thermostatically-controlled switch 146. In this case the operator turns the knob 148 to indicate the desired temperature and thereupon the main switch is opened and closed under the control of the thermostat to maintain a constant temperature of the degree indicated.

In Figs. 20 and 21 is shown another self-contained regulator unit with a diagram of wiring in which the control may selectively be either thermostatic alone or thermostatic for a predetermined time period. In this form the casing 140 with its thermostat element and its connecting wires 149, 150 and 151 are similar to those already described, the size of the casing being suited to the elements contained. Inside the casing are mounted, first, a main switch 152, second, a chronometer-controlled switch mechanism 153 with the dial 154 and pointers such as have already been described, third, a thermostatically-controlled switch 155 and an electromagnet 156 of the type already described. The shunt circuit runs through the magnet winding and divides into two branches in parallel between the points 157 and 158, the contacts of the thermostatically-controlled switch being located in one branch and the contacts of the chronometer-controlled switch being located in the other branch. This circuit as before extends around the main switch. A manually controlled switch 159 is located in the branch containing the chronometer-controlled switch. This switch 159 is operated by a handle 160 extending through an opening in the casing. If the operator desires the control to be thermostatic during a predetermined period of time, this switch is thrown to the "On" position. The operation of the mechanism under this method of control will be apparent from the description already given.

It will be observed that in the forms of the device containing a chronometer-controlled switch, the chronometer for controlling this switch is itself located inside the casing with the pointers or hands by means of which its period of control is manually determined extending to and operable from the exterior of the casing; that in all forms of the device the means, such as the knob, by which the position or temperature at which the thermostat shall open and close the switch controlled by it is manually determined also extends to and is operable from the exterior of the casing; and that in the forms of the device having the regulator switching mechanism, the pointer by which the position thereof is manually determined also extends to and is operable from the exterior of the casing, so that the controlling mechanism, whatever may be its form or components, is manually positioned by means extending to and operable from the exterior of the casing.

Having thus described the invention, what is claimed as new, and desired to be secured by Letters Patent, is:

1. A self-contained regulator unit for a device electrically heated by a supply circuit comprising a casing, a thermostat associated with the casing and locatable in the said device, and controlling mechanism in the casing insertable in the supply circuit and positionable either to maintain the supply circuit, to cause the supply circuit to open and close at predetermined temperature positions of the thermostat, to cause the supply circuit to close and open at predetermined times while remaining closed between such times, or to cause the supply circuit to close and open at predetermined times and between such times to open and close at predetermined temperature positions of the thermostat.

2. A self-contained regulator unit for a device electrically heated by a supply circuit comprising a casing, a thermostat associated with the casing and locatable in the said device, and controlling mechanism in the casing insertable in the supply circuit and positionable either to cause the supply circuit to open and close at predetermined temperature positions of the thermostat or to cause the supply circuit to close and open at predetermined times and between such times to open and close at predetermined temperature positions of the thermostat.

3. A self-contained regulator unit for a device electrically heated by a supply circuit comprising a casing, a thermostat associated with the casing and locatable in the said device, controlling mechanism in the casing comprising (1) a chronometer-controlled switch, (2) a switch controlled by the said thermostat, (3) an electromagnet, (4) a self-closing main switch and means for maintaining the main switch open during the energization of the electromagnet, (5) a shunt circuit insertable in the supply circuit around the main switch, (6) a shunt circuit containing the electromagnet winding and having two branches in parallel, one containing the chronometer-controlled switch and the other containing the thermostat-controlled switch, insertable in the supply circuit around the heater device and the first shunt circuit, and, (7) regulator switching mechanism positionable either (a) to open the first shunt circuit and the chronometer branch circuit and close the thermostat branch circuit or (b) to open the first shunt circuit and the thermostat branch circuit and close the chronometer branch circuit or (c) to open the first shunt circuit and close the chronometer and thermostat branch circuits or (d) to close the first shunt circuit, whereby the supply of current to the heater device will be selectively determined either (a) by the thermostat alone, (b) by the chronometer alone, (c) by the thermostat for a period determined by the chronometer, or (d) by the supply circuit alone.

4. A self-contained regulator unit for a device electrically heated by a supply circuit comprising a casing, a thermostat associated with the casing and locatable in the said device, controlling mechanism in the casing comprising (1) a chronometer-controlled switch, (2) a switch controlled by the said thermostat, (3) an electromagnet, (4) a self-closing main switch and means for maintaining the main switch open during the energization of the electromagnet, (5) a shunt circuit containing an electromagnet winding and having two branches in parallel, one containing the chronometer-controlled switch and the other containing the thermostat-controlled switch insertable in the supply circuit around the heater device and the main switch and (6) regulator switching mechanism positioned either to open or close the chronometer branch circuit whereby the supply of current to the heater device will be selectively determined either (a) by the thermostat alone or (b) by the thermostat for a period determined by the chronometer.

5. A self-contained regulator unit for a device electrically heated by a supply circuit comprising a casing, a thermostat associated with the casing and locatable in the said device, controlling mechanism in the casing comprising (1) a switch controlled by the said thermostat, (2) an electromagnet, (3) a self-closing main switch and means for maintaining the main switch open during the energization of the electromagnet and (4) a shunt circuit containing the electromagnet winding and the thermostat-controlled switch insertable in the supply circuit around the heater device and the main switch, whereby the supply of current to the heater device will be determined by the thermostat.

6. A self-contained regulator unit having the construction defined in claim 1, together with manually operated means for positioning the controlling mechanism, as defined in said claim, extending to and operable from the exterior of the casing.

7. A self-contained regulator unit comprising the construction defined in claim 2, together with manually operated means for positioning the controlling mechanism, as defined in said claim, extending to and operable from the exterior of the casing.

8. A self-contained regulator unit comprising the construction defined in claim 3, in which the regulator switching mechanism is provided with a handle extending to and operable from the exterior of the casing.

9. A self-contained regulator unit comprising the construction defined in claim 3, together with a chronometer located in the casing for controlling the chronometer-controlled switch and manually operated means extending from said chronometer to and operable from the exterior of the casing to determine the period of control by the chronometer.

10. A self-contained regulator unit having the construction defined in claim 3, in which the regulator switching mechanism is provided with a handle extending to and operable from the exterior of the casing, a chronometer located in the casing for controlling the chronometer-controlled switch and manually operated means extending to and operable from the exterior of the casing to determine the temperature at which the thermostat shall open and close the switch controlled by it.

11. A self-contained regulator unit having the construction defined in claim 4, in which the regulator switching mechanism is provided with a handle extending to and operable from the exterior of the casing.

12. A self-contained regulator unit having the construction defined in claim 4; together with a chronometer located in the casing for controlling the chronometer-controlled switch and manually operated means extending from said chronometer to and operable from the exterior of the casing to determine the period of control by the chronometer.

13. A self-contained regulator unit having the construction defined in claim 4, in which the regulator switching mechanism is provided with a handle extending to and operable from the exterior of the casing, a chronometer located in the casing for controlling the chronometer-controlled switch and manually operated means extending to and operable from the exterior of the casing to determine the temperature at which the thermostate shall open and close the switch controlled by it.

14. A self-contained regulator unit comprising the construction defined in claim 5, together with manually operated means extending from the controlling mechanism to and operated from the exterior of the casing to determine the temperature at which the heater device will be maintained by the thermostat.

15. The combination of a cooking range having an oven electrically heated by a supply circuit and a self-contained regulator unit having the construction defined in claim 3, the oven wall being provided with a hole through which the thermostat extends and is located in the oven.

16. A self-contained regulator unit for a device adapted to be heated by passing current from a source of supply to and through a resistance element associated therewith, comprising a casing, a thermostat associated with said casing adapted to be arranged in proximity to the heated device and to be affected by heat generated by the passage of current through the resistance element, automatic controlling mechanism within said casmatic controlling mechanism within said casing insertable in the supply circuit and acting to cause the supply circuit to open and close at predetermined temperature positions of the thermostat, and mechanism associated with the casing for rendering the said controlling mechanism ineffective to open and close the supply circuit and for closing the supply circuit independently of the automatic controlling mechanism to cause the device to be heated.

17. A self-contained regulator unit adapted for application to and removal from an electrically heated device, comprising the construction defined in claim 16, together with manually operated means to determine the position at which the thermostat shall open and close, as defined in said claim, extending to and operable from the exterior of the casing.

18. In a cooking range having associated therewith an oven, an electric heating element for said oven, means for controlling the supply of electricity to the heating element, said controlling means being in electrical communication with the heating element, a thermostatically controlled mechanism forming a part of said means for controlling the supply of electricity arranged in proximity to the oven, and a mechanism forming another part of said controlling means positionable either to place the thermostatically controlled mechanism in the supply circuit to cause the circuit to open and close at predetermined temperature positions of the thermostat or to render the thermostatically controlled mechanism inoperative by permitting the current to flow in shunt relation to the thermostatically controlled mechanism thereby allowing the operation of the range independent of the theremostatically controlled mechanism while said mechanism remains associated with the oven.

19. In combination with an electrical heating unit, a source of electrical current supply, an electrical resistance element connected to the source of supply through the medium of electrical conductors for generating heat to be utilized for cooking and the like, a controlling switch arranged in the conductors, means arranged in the conductors for permitting the flow of current to the resistance element therethrough depending upon the self-positioning of the controlling switch, a self-contained regulator unit provided with a thermostat for controlling an electrical switch which is connected by means of conducting elements cooperating with elements of the means arranged in the conductors for permitting the flow of current, the connection afforded by said elements effecting the insertion of said unit electrically in the conductors to place the flow of current through the conductors under the influence of the thermostat, and means associated with the unit for rendering the switch controlled by the thermostat inoperative so that the flow of current to the resistance element is placed under the control of the controlling switch while the unit is maintained in its electrically connected condition with respect to the conductors.

20. In combination with an electrical heating unit, a source of electrical current supply, an electrical resistance element connected to the source of supply through the medium of the electrical conductors for generating heat to be utilized for cooking and the like, a self-contained regulator unit comprising an electrical switch adapted to be inserted in the conductors for affecting the flow of current through the conductors and a thermostat for controlling the electrical switch together with an electrically responsive element under the control of the thermostat, and connections for supplying electricity from the source of supply to the electrically responsive element for effecting an operation of the switch according to the position of the thermostat.

21. The combination of a cooking range having an oven adapted to be heated by an electrical resistance element connected by means of electrical conductors to a supply circuit, a self-contained thermostat regulator unit having means associated therewith positionable to effect a control of the flow of current through the conductors to the resistance element, and an electrically responsive means capable of placing the flow of current under the control of said positionable means, a wall of the oven being provided with a hole through which the thermostat of the unit extends and is located in the oven so that the unit may be maintained associated with the oven with the thermostat projecting into the heated space, and in which the controlling mechanism of the unit is electrically inserted in the supply circuit connection of the range which supplies current to the resistance element for permitting the supply of current to the electrically responsive means and for controlling the placing of the flow of current under the control of the positionable means.

22. The combination of an electrically heated oven adapted to be heated by an electrical resistance element connected to a source of supply by means of conductors, an opening in a wall of the device leading to the heated space within, a regulator formed as a separate self-contained unit and provided with a casing, a thermostat controlling element projecting from the casing, an electric switching device and an electrically responsive element under the control of the thermostat within the casing, the regulator unit being adapted to be detachably mounted upon the electrically heated device with its thermostat controlling element projecting through the opening therein, and quick-detachable connecting means arranged between the source of supply and the resistance element for permitting the insertion of the switching device in the casing into the circuit supplying current to the resistance element and for permitting supply of current to the electrically responsive element.

In testimony whereof, I have signed my name to this specification.

FRANK W. HEWITT.